United States Patent
Kumata et al.

[11] 3,873,407
[45] Mar. 25, 1975

[54] SKIN POLYURETHANE FOAM

[75] Inventors: Koji Kumata, Kyota; Kozaburo Nagata, Shiga, both of Japan

[73] Assignee: Sanyo Chemical Industries, Ltd., Kyoto, Japan

[22] Filed: Dec. 15, 1972

[21] Appl. No.: 315,647

[30] Foreign Application Priority Data
Dec. 18, 1971 Japan.............................. 46-103020

[52] U.S. Cl................. 161/160, 161/161, 161/190, 264/45, 264/54
[51] Int. Cl............................................... B32b 3/26
[58] Field of Search .................. 260/2.5 A, 2.5 BD; 161/160, 161, 190; 264/45, 54

[56] References Cited
UNITED STATES PATENTS
2,855,021  10/1958  Hoppe ................................ 264/45
3,072,582  1/1963  Frost ............................. 260/2.5 AZ
3,248,373  4/1966  Barringer ........................... 260/77.5
3,473,951  10/1969  DeRossi et al. ............... 260/2.5 AZ
3,523,918  10/1970  Gonzalez....................... 260/2.5 AZ
3,655,597  4/1972  Strassel......................... 260/2.5 AZ FOREIGN PATENTS OR APPLICATIONS
664,192  6/1963  Canada................................ 264/45

Primary Examiner—George F. Lesmes
Assistant Examiner—R. J. Roche
Attorney, Agent, or Firm—Oblon, Fisher, Spivak, McClelland & Maier

[57] ABSTRACT

A polyurethane composite article is provided which comprises a "skin" or cover layer of a substantially linear polyurethane, an intermediate layer of a two component-type polyurethane, and a urethane foam filled therein.

4 Claims, 6 Drawing Figures

PATENTED MAR 25 1975 3,873,407

SKIN POLYURETHANE FOAM

BACKGROUND OF THE INVENTION

1. Field of the Invention:

This invention relates to composite articles of polyurethane foam having an outer cover (hereinafter referred to as the "skin urethane foam"), which articles are suitable for use as upholstery materials, and more particularly to an article comprising an outer cover, an intermediate layer and a polyurethane foam fill.

2. Description of the Prior Art:

Various methods of producing a skin urethane foam have been proposed. One of the methods comprises allowing a polyurethane foam-forming mixture to expand in a mold cavity covered by a thin soft polyvinylchloride layer, which is formed by placing a previously prepared sheet into the mold or by coating the mold with a plastisol and then heating. This method has not proven to be completely satisfactory, however, since it is periodically complex and since changes in the softness of the cover often occur due to out migration of the plasticizer from the polyvinylchloride.

Recently, a new process has been developed known as the integral skin process. The product is known as an "integral skin urethane foam". In that process both the foam and the cover of the integral skin foam are formed in a mold cavity from a single mixture of raw materials by a single shot process. The process has the advantage, therefore, that it is operationally simple. However, it is very difficult to select a single polyurethane-forming mixture which is suitable for both the cover and the foam and that process is economically disadvantageous, especially in the case of forming large articles, because the materials required are very expensive. Accordingly, that process has found only limited success, mostly in the production of small articles, such as automobile interior parts.

In another heretofore proposed method, a skin urethane foam has been produced by first coating the inner surface of the mold cavity with a polyurethane which can form a film, and then charging a foamforming mixture into the mold cavity. The film on the mold cavity is transferred onto the surface of the resulting urethane foam. This process has several advantages. For one, the operation of the process is rather simple, and it is economical, because it requires only a small amount of the expensive polyurethane for the formation of the cover film. Both the cover and the foam of the product in the process have good properties, because the optimum type of polyurethane can be selected for each. However, that process does have certain disadvantages. The strength of the bond between the cover and the foam is poor, and even if good adhesion can be obtained, there will be points at which the cover and the foam are not completely integrated. That process, therefore, has not seen commercial acceptability.

A need exists, therefore, for a technique of inexpensively producing a composite polyurethane foamed product in which the skin cover and the interior foam can be separately selected for optimum characteristics and in which good, integral bonding is formed between the components of the composite.

SUMMARY OF THE INVENTION

Accordingly, it is one object of this invention to provide an improved process for economically producing an article comprising a polyurethane outer cover and polyurethane foam filled therein in which both are completely integrated. This and other objects of this invention will become more apparent from the following description and drawings.

It has now been found that the objects of this invention are accomplished by integrating the polyurethane outer cover and the polyurethane foam through an intermediate layer formed from a two component-type polyurethane. Thus, broadly the process of this invention comprises:

1. applying a solution of a substantially linear polyurethane to the cavity of a mold,
2. drying the applied solution to yield a film,
3. applying a two component-type polyurethane on the film,
4. introducing a urethane foam-forming mixture into the mold cavity before the two component-type polyurethane cures completely, and
5. allowing the urethane foam-forming mixture to foam.

In describing this invention, reference shall be made to the accompanying Drawings, in which:

FIGS. 1 to 5 are cross-sectional views of a mold showing what happens in a mold at some steps of the process of this invention, and, FIG. 6 is a cross-sectional view of the skin urethane foam produced according to this invention.

DETAILED DESCRIPTION OF PREFERRED EMBODIMENTS

Figure 1:

The linear polyurethane, the two component-type polyurethane and polyurethane foam-forming mixture used in performing the process of this invention are all well known in the art.

The linear polyurethane used for the outer cover of this invention is an organic solvent soluble, substantially linear polyurethane. A solution of the linear polyurethane is preferably produced by reacting the raw materials therefor in the presence of an organic solvent. It may also be produced by dissolving a preformed linear polyurethane in an organic solvent. Thus, the solution of the linear polyurethane is produced by reacting a polyol having a high molecular weight, an organic polyisocyanate and a chain extender in the presence of an organic solvent according to conventional procedures. The molar ratio of isocyanate group to active hydrogen-containing group (of the polyol and chain extender) is about equivalent (i.e., 0.95 – 1.1, preferably 1.0 – 1.05).

Examples of suitable polyols are the polyester polyols, polyether polyols and polyester-polyether polyols. Preferable examples of the polyols are polyalkyleneadipatediols (e.g., polyethylene–adipatediols, polybutyleneadipatediols, polyethylenebutyleneadipate diols), polylactonediols (e.g., polycaprolactonediols), whose molecular weights are from 1,000 – 3,000. Also useable are the polyetherpolyols (1,000 – 3,000 of molecular weight) such as a polytetramethyleneglycol.

Suitable chain extenders include the glycols, such as ethylene glycol, trimethylene glycol, 1,4-butylene glycol, diethylene glycol and neopentyl glycol. There may also be used aliphatic diamines (e.g., ethylene diamine, butylene diamine and cyclohexylene diamine), aromatic diamines (e.g., phenylene diamine and diphenylmethane diamine).

Examples of the organic polyisocyanate are 4,4'-diphenylmethane diisocyanate (MDI), tolylene diisocyanate, xylylene diisocyanate, hexamethylene diisocyanate, isophorone diisocyanate, dicyclohexylmethane diisocyanate. Preferable is MDI.

Suitable organic solvents include N,N-dimethyl formamide (DMF), dimethylsulfoxide (DMSO), N,N-dimethyl acetamide, methyl ethyl ketone (MEK), tetrahydrofuran. Preferable is DMF.

The linear polyurethane is dissolved in the solvent to a concentration of 10 – 70 percent, preferably 25 – 40 percent by weight. It may be additionally diluted with a highly volatile solvent, such as tetrahydrofuran, methyl ethyl ketone, ethyl acetate or toluene to a concentration of 1 – 15 percent (preferably 5 – 10 percent). The solution may contain a pigment of filler. The solution is applied to the mold cavity by conventional methods, preferably by spraying. It is then dried at ambient or elevated temperatures to form a thin film. The solution may be applied twice or more. The film may have a wide range of thicknesses, but good results are attainable at an average thickness of 0.01 – 1.0 mm.

The two component-type polyurethane used in this invention is a curable polyurethane consisting of (1) a polyurethane prepolymer having free isocyanate groups and (2) a hardener. The prepolymer (preferably liquid) may be a conventional prepolymer. Thus, it may be produced by reacting a polyol having a high molecular weight with an organic polyisocyanate, if desired, with the addition of a compound having at least two active hydrogen atoms, such as a glycol, or a diamine. The molar ratio (NCO / OH) should be at least 1.2 (preferably 1.8 – 5.0). Examples of suitable polyols are those having at least two hydroxyl groups such as the polyether polyols, polyester polyols, polyetherpolyesterpolyols or the polyamide polyols, which have a molecular weight of 800 – 3,000 per hydroxyl group. Preferable are the polyoxypropylene polyols and polyoxypropyleneoxyethylene polyols having 2 – 4 hydroxyl groups and a molecular weight of 800 – 3,000 per one hydroxyl group. Exemplary of the organic polyisocyanate used for the prepolymer are the same for the linear polyurethane mentioned above, but preferably it is a mixture of 2,4-/2,6-tolylene diisocyanates.

The hardener which is the other component of the two component-type polyurethane is a compound having at least two active hydrogen atoms, and preferably is a mixture of a polyol having a high molecular weight with a cross-linking agent having a low molecular weight (e.g., less than 500). The hardener may contain other ingredientss such as a builder (e.g., petroleum resin, coal tar, talc and barium sulfate), a solvent, and a catalyst (e.g., amine compounds and tin compounds). Exemplary of the polyol is the same for the prepolymer, and preferable is polyoxypropylene polyols and polyoxypropyleneoxyethylene polyols which have 2 – 4 hydroxyl groups and a molecular weight of 800 – 3,000 per one hydroxyl group. Exemplary of the cross-linking agents are ethylene glycol, trimethylene glycol, butylene glycol, diethylene glycol, neopentyl glycol, glycerine, ethylene diamine, diphenylmethane diamine, benzidine and dichlorodiphenylmethane diamine. Preferable are diphenylmethane diamine and dichlorodiphenylmethane diamine.

The two component-type polyurethane is produced by mixing the prepolymer with the hardener at such a ratio that the molar ratio of the isocyanate group of the prepolymer to the active hydrogen atom of the hardener is about one. In this case, they are mixed without a solvent, but, if desired, a small amount of a solvent may be used (e.g., toluene, DMF, MEK and ethyl acetate). The two component-type polyurethane, before it cures, is applied to the mold cavity which is already covered with the film of the linear polyurethane by spraying or other methods. The thickness of the resulting intermediate layer may vary over a wide range according to the hardness of the urethane foam filled therein, and usually is between 0.1 – 1 mm. While the intermediate layer continues to be curable, the urethane foam-forming mixture is introduced.

The intermediate layer acts not only as a binding agent between the cover layer and the foam filling, but also as part of the cover layer. Furthermore, the intermediate layer before curing influences the foaming of the urethane foam-forming mixture charged into the mold cavity. The surface of the foam will conform to the structure of the cover layer. This may be one reason why the skin urethane foam of this invention is characterized by a good hand.

The urethane foam-forming mixture in this invention is the same as in conventional formulations for flexible polyurethane foams (soft and semi-rigid). The mixture generally comprises a polyol having a high molecular weight, an organic polyisocyanate, a foaming agent, a catalyst, a foam stabilizer and other auxiliary agents such as a coloring agent, a flame retardant or a filler. These compounds are not specifically limited. They may be selected from known components for flexible urethane foams. Exemplary of polyols having high molecular weights are the polyester polyols, polyether polyols and polyetherpolyester polyols. The molecular weights of the polyol used may be from 150 –15,000, preferably 300–8,000. Exemplary or organic polyisocyanates are the same for the two componettype polyurethane. Preferable are MDI and tolylenediisocyanates. Exemplary of the foaming agents used are water and the halogenated hydrocarbons. Exemplary of the foam stabilizers are the known silicone derivatives and various mixtures of surface active agents. Amounts of these agents may be the same as in conventional formulations for flexible polyurethane foams. The preferable foam-forming mixture is a formulation for the so-called cold mold polyurethane foams which can expand without heating.

The urethane foam-forming mixture is charged into the mold cavity which has been treated as mentioned above, and is allowed to foam and cure at ambient or elevated temperature. The resulting skin urethane foam is removed from the mold. The foam may be post-cured at ambient or elevated temperature.

In this invention, any conventional mold which has a mold cavity having a predetermined shape may be used. The mold may have a cover to close the cavity. The mold cavity is preferably treated with a release agent to make the removal of the product easier. The mold is preferably maintained at an elevated temperature (e.g., up to 100°C.) during the entire operation of the process.

Figure 2:
Figure 3:
Figure 4:
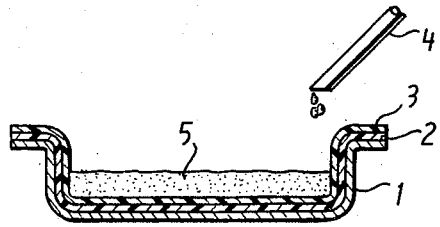
Figure 5:
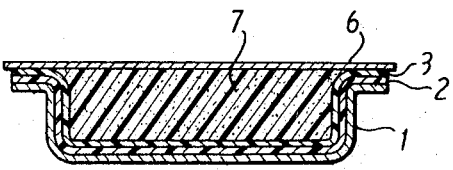
Figure 6:
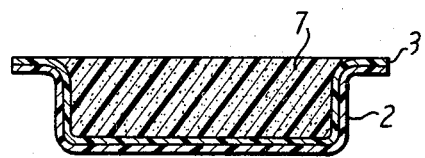

A process of this invention will now be illustrated by reference to the Figures: FIG. 1 shows a cross-section of a mold 1. The cover layer 2 is applied to the cavity of the mold (FIG. 2). The urethane foam-forming mixture 5 is charged into the cavity through a mixing nozzle 4 (FIG. 4), after the intermediate layer 3 is applied to the cavity (FIG. 3). The mold is closed by a cover 6, and the mixture 5 is allowed to form a foam 7 (FIG. 5). The resulting skin foam, having the structure as shown in FIG. 6 is removed from the mold.

The process of this invention is simple in operation, and economical. In addition, the resulting skin urethane foam has a completely integrated structure and has a good feel. It is useful for preparing upholstery materials, especially in the transportation and furniture industries.

Having generally described the invention, a further understanding can be attained by reference to the following Examples which are presented as illustrative of this invention only, and it will be understood that the invention is not limited thereto unless otherwise specifically specified.

EXAMPLE 1

1. Application of the cover layer.

A mold having the shape of cushion (30 × 30 × 5 cm.) made of cast iron was maintained at 70°C. and treated with a releasing agent. A solution having the following formulation was applied to the cavity of the mold by a spray gun, and dried to make a film 0.05 mm. thick.

| [The formulation] | Parts by weight |
| --- | --- |
| Linear polyurethane solution | 100 |
| Carbon black | 1 |
| Methyl ethyl ketone (MEK) | 100 |

In the above formulation, the linear polyurethane solution was produced by reacting polybutyleneadipatediol having a molecular weight of 2,000, 4,4'-diphenylmethane diisocyanate (MDI) and ethylene glycol (1 : 3.5 : 2.5 by mole) in the presence of a mixed solvent of DMF and MEK (2 : 5 by weight). The solution thus obtained consists of the polyurethane (30 percent), DMF (20 percent), and MEK (50 percent by weight).

2. Application of the intermediate layer.

A two-component-type polyurethane consisting of the following formulation was applied to the mold cavity by a spray gun to be about 0.5 mm. thick.

| [Formulation] | Part by weight |
| --- | --- |
| Prepolymer component | 100 |
| Hardener component | 21 |

The above prepolymer component consists of 10 parts of toluene and 90 parts of a prepolymer obtained by reacting polypropyleneglycol having a molecular weight of 2,500 with tolylene diisocyanate (TDI) in such amount that the ratio NCO/OH is about 2. The hardener component consists of 76 parts of polyoxypropyleneoxyethylenetriol having a molecular weight of 3,000, 25 parts of 4,4'-diphenylmethane diamine, 0.2 part of triethylene diamine and 0.8 part of dimethylethanol amine.

3. Formation of the foam filling.

Before the intermediate layer cured completely, a urethane foam-forming mixture having the following formulation which was for the cold mold flexible urethane foam was introduced. The mixture was allowed to foam at room temperature for 10 minutes, after the mold cavity was closed with the mold cover. The resulting skin urethane foam was taken out of the mold, and post-cured at room temperature overnight. There was obtained the skin urethane foam having a high elasticity and a touch suitable for cushion.

| [Formulation of the foam-forming mixture] | Parts by weight |
| --- | --- |
| Polyoxypropyleneoxyethylene triol (Molecular weight: 6,000) | 98 |
| Triethanol amine | 2 |
| Water | 2 |
| Triethylene diamine | 0.1 |
| Triethylamine | 0.5 |
| Silicone surfactant | 1.0 |
| Crude MDI | 17 |
| TDI | 17 |

EXAMPLE 2

1. Application of the cover layer.

Example 1 was repeated.

2. Application of the intermediate layer.

Example 1 was repeated, except that the thickness was about 0.25 mm.

3. Formation of the foam filling.

Before the intermediate layer cured completely, a urethane foam-forming mixture having the following formulation which was for the cold mold semi-rigid polyurethane foam was introduced. The mixture was allowed to foam at room temperature for about 5 minutes, after the mold was closed with the mold cover. The resulting skin urethane foam was then removed from the mold, and post-cured at room temperature overnight. There was obtained the skin semi-rigid urethane foam having a high impact resistance which is suitable for application as the dash-board of an automobile.

| [Formulation of the foam-forming mixture] | Parts by weight |
| --- | --- |
| Polyoxypropyleneoxyethylene tetraol (Molecular weight : 6,000) | 95 |
| Triethanol amine | 5 |
| Water | 2 |
| Triethylamine | 0.5 |
| Crude MDI | 58 |

EXAMPLE 3

1. Application of the cover layer.

Example 1 was repeated, except that there was used another linear polyurethane solution (30 percent) produced by reacting polyethyleneadipatediol having a molecular weight of 2,000, MDI and 1,4-butylene glycol (1 : 4.5 : 3.5 by mole) in the presence of DMF and MEK (3 : 4 by weight). 2. Application of the intermediate layer.

Example 1 was repeated, except that another two-component-type polyurethane having the following formulation was used:

| [Formulation] | Parts by weight |
| --- | --- |
| Prepolymer | 117 |
| Hardener | 100 |

The above prepolymer component is a product obtained by reacting polypropylene glycol having a molecular weight of 2,500 with MDI in such an amount that the ratio NCO/OH is about 5. The hardener component consists of 90 parts of poly(diethyleneglycol adipate) having a molecular weight of 2,000, 10 parts of 1,4-butanediol, 0.2 part of triethylenediamine and 0.8 part of diethylethanol amine. 3. Formation of the foam.

Example 1 was repeated to obtain almost the same akin urethane foam as in Example 1.

Having now fully described the invention, it will be apparent to one of ordinary skill in the art that many changes and modifications can be made thereto without departing from the spirit or scope of the invention as set forth herein. Accordingly,

What is claimed and intended to be covered by Letters Patent is:

1. A skin urethane foam, which comprises:

a cover layer of an organic solvent soluble, substantially linear polyurethane of an average thickness of 0.01 – 1.0 mm formed by applying a solution of said substantially linear polyurethane which is formed by reacting a polyol having a molecular weight of 1,000 – 3,000 with an organic polyisocyanate and with a chain extender in amounts such that the ratio of isocyanate groups to active hydrogen containing groups is 0.95 – 1.1, said polyol being selected from the group consisting of polyester polyol, polyether polyol and polyester-polyether polyol, said polyisocyanate being selected from the group consisting of 4,4'-diphen methane diisocynate, tolylene diisocyanate, xylene diisocyanate, hexamethylene diisocyanate, isophorone diisocyanate, dicyclohexylmethane diisocyanate, said chain extender being selected from the group consisting of ethylene glycol, trimethylene glycol, 1,4-butylene glycol, diethylene glycol and neopentyl glycol, to the cavity of a mold and drying the applied solution;

an intermediate layer applied onto the cover layer and formed from a two component-type polyurethane consisting essentially of a polyurethane prepolymer having free isocyanate groups and a hardener which comprises a mixture of a polyol having a molecular weight of 800 – 3,000 per hydroxyl group with a cross-linking agent having a molecular weight less than 500; and a urethane foam layer formed by introducing a urethane foam-forming mixture into the cavity of said mold onto said intermediate layer before said intermediate layer cures completely and allowing the urethane foam-forming mixture to foam, wherein said cover layer and said foam are integrally bound by said intermediate layer.

2. The skin urethane foam of claim 1, wherein said intermediate layer has an average thickness of 0.1 – 1.0 mm.

3. The skin urethane foam of claim 1 wherein said polyurethane prepolymer is prepared by reacting an organic polyisocyanate with a polyol wherein the mol ratio of the NCO groups of said polyisocyanate to the OH groups of said polyol is at least 1.2, said polyol being selected from the group consisting of polyether polyol, polyester polyol, polyether polyester polyol and polyamide polyol.

4. The skin urethane foam of claim 1, wherein said urethane form is a flexible urethane foam.

* * * * *